United States Patent
Takizawa et al.

(10) Patent No.: US 10,412,245 B2
(45) Date of Patent: Sep. 10, 2019

(54) METHOD OF MANUFACTURING LIGHT-TRANSMITTING MEMBER, LIGHT-TRANSMITTING MEMBER AND IMAGE READING APPARATUS

(71) Applicant: CANON KABUSHIKI KAISHA, Tokyo (JP)

(72) Inventors: Tokuji Takizawa, Utsunomiya (JP); Akira Matsumoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/991,320

(22) Filed: May 29, 2018

(65) Prior Publication Data

US 2018/0352101 A1    Dec. 6, 2018

(30) Foreign Application Priority Data

May 30, 2017    (JP) ................. 2017-106432

(51) Int. Cl.
| | | |
|---|---|---|
| H04N 1/00 | (2006.01) | |
| H04N 1/12 | (2006.01) | |
| H04N 1/028 | (2006.01) | |
| G03G 15/04 | (2006.01) | |

(52) U.S. Cl.
CPC ..... *H04N 1/00596* (2013.01); *H04N 1/00588* (2013.01); *H04N 1/00602* (2013.01); *H04N 1/02835* (2013.01); *H04N 1/121* (2013.01); *G03G 15/04072* (2013.01)

(58) Field of Classification Search
None
See application file for complete search history.

(56) References Cited

U.S. PATENT DOCUMENTS

| | | | | |
|---|---|---|---|---|
| 5,261,013 A | * | 11/1993 | Murata | ............. H01L 31/02164 |
| | | | | 257/431 |
| 2013/0174892 A1* | | 7/2013 | Ganjoo | .................... H01B 1/08 |
| | | | | 136/252 |
| 2014/0061431 A1* | | 3/2014 | Fukagawa | ................. G01J 1/42 |
| | | | | 250/206 |

FOREIGN PATENT DOCUMENTS

| | | |
|---|---|---|
| JP | 2005184069 A | 7/2005 |
| JP | 2006211031 A | 8/2006 |

\* cited by examiner

*Primary Examiner* — Frantz Bataille
(74) *Attorney, Agent, or Firm* — Carter, DeLuca & Farrell LLP

(57) ABSTRACT

According to the present invention, there is provided a method of manufacturing a light-transmitting member for an image reading apparatus configured to read an image on a conveyed original, the method including: disposing a plurality of substrates each having a first light-transmitting surface and a second light-transmitting surface opposed to each other so that a part of the first light-transmitting surface of one of two adjacent substrates is in contact with a part of the second light-transmitting surface of another of the two adjacent substrates; and providing coating on the first light-transmitting surface of each of the plurality of substrates.

17 Claims, 10 Drawing Sheets cross section A-A'    cross section B-B' cross section C-C'

METHOD OF MANUFACTURING LIGHT-TRANSMITTING MEMBER, LIGHT-TRANSMITTING MEMBER AND IMAGE READING APPARATUS

BACKGROUND OF THE INVENTION

Field of the Invention

The present invention relates to a light-transmitting member, and particularly to a light-transmitting member suitable for use as a flow-reading glass for an image reading apparatus including an automatic document feeder (ADF).

Description of the Related Art

It has been known that, in an image reading apparatus including an automatic document feeder, a streak-like image defect may occur on a read image due to adhesion of dust to platen glass. The dust may be floating dust such as paper powder generated from a conveyed original or powder dust in the apparatus, or fixed dust caused by a sticky substance adhering to an original, such as a sticky note, a tape, or an uncured correction liquid.

In Japanese Patent Application Laid-Open No. 2005-184069, there is disclosed an image reading apparatus including a platen glass capable of reducing adhesion of floating dust through removal of charge by providing a conductive aluminum sheet so as to extend on both the front surface and the back surface and applying transparent conductive coating on the front surface.

In Japanese Patent Application Laid-Open No. 2006-211031, there is disclosed an image reading apparatus including a platen glass capable of reducing adhesion of dust as well as entry of the dust into the apparatus by providing dirt-proof coating only on a part of the front surface.

At the time of providing the coating on the front surface of the platen glass as in Japanese Patent Application Laid-Open No. 2005-184069 and Japanese Patent Application Laid-Open No. 2006-211031, when the coating is to be provided only on a part of the front surface, complicated masking is required in a related-art method as described later with reference to FIG. 10A and FIG. 10B. Hence, the number of products to be processed is reduced, with the result that cost is increased.

SUMMARY OF THE INVENTION

Therefore, it is an object of the present invention to provide a method of manufacturing a light-transmitting member at low cost, which has coating provided only on a part of the front surface of the light-transmitting member for an image reading apparatus, configured to read an image on a conveyed original.

According to one embodiment of the present invention, there is provided a method of manufacturing a light-transmitting member for an image reading apparatus configured to read an image on a conveyed original, the method including: disposing a plurality of substrates each having a first light-transmitting surface and a second light-transmitting surface opposed to each other so that a part of the first light-transmitting surface of one of two adjacent substrates is in contact with a part of the second light-transmitting surface of another of the two adjacent substrates; and providing coating on the first light-transmitting surface of each of the plurality of substrates.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Now, a light-transmitting member according to this embodiment will be described in detail based on the accompanying drawings. The drawings to be referred in the following description may be drawn on a scale different from an actual scale so as to enable easy understanding of this embodiment.

Figure 5:
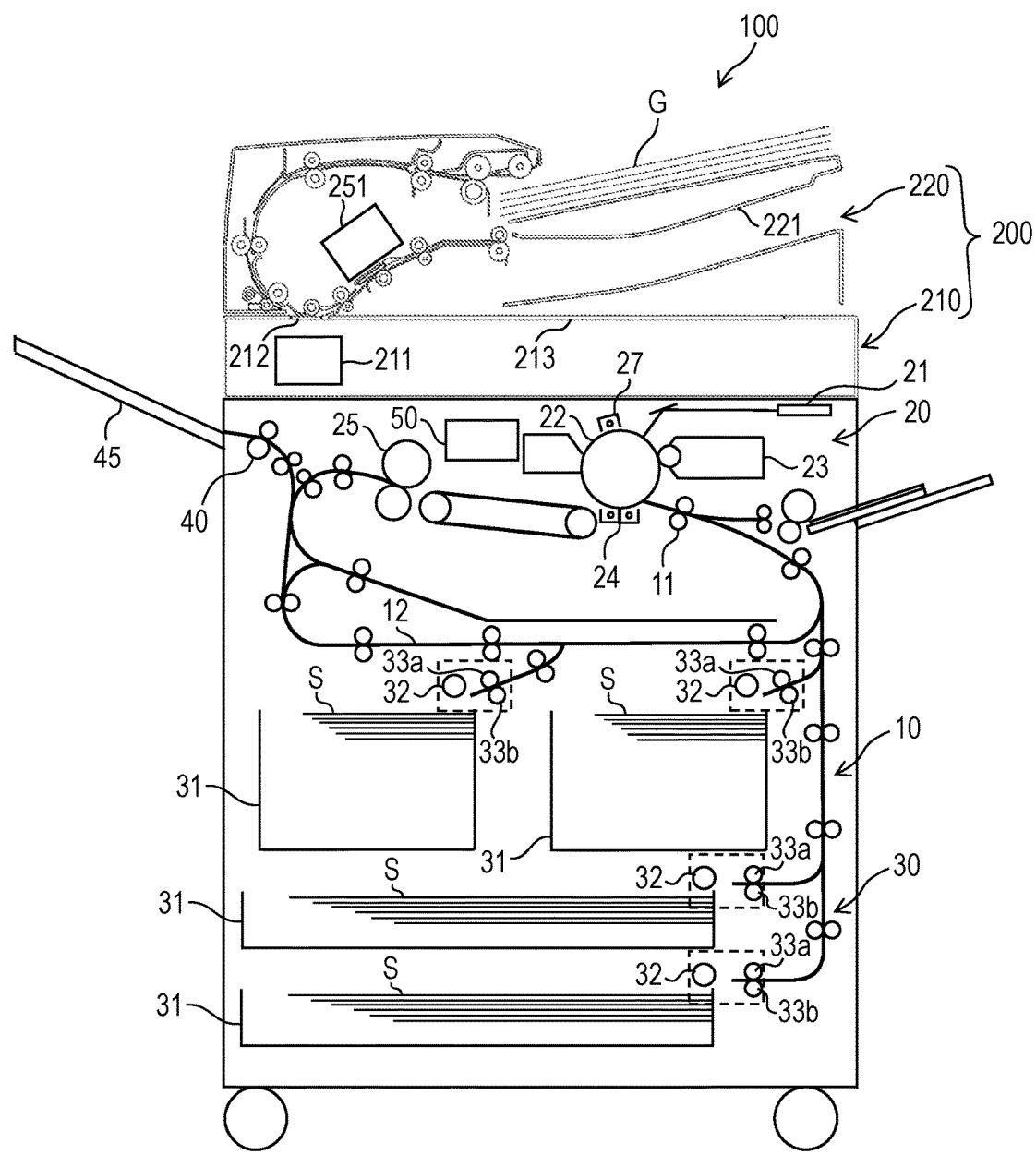
FIG. 5 is a schematic sectional view of an image reading and forming apparatus to which the flow-reading glass according to the first embodiment is mounted.

FIG. 5 is a schematic sectional view of an image reading and forming apparatus 100 to which a first flow-reading glass (light-transmitting member) 212 according to this embodiment is mounted.

Hereinafter, a position with the operation portion (not shown) in which the user performs various inputs and settings in an image reading and forming apparatus 100 is referred to as a "near side" of the image reading and forming apparatus 100, and the back surface side opposite to the near side is referred to as a "far side".

That is, FIG. 5 is a sectional view for illustrating the internal configuration of the image reading and forming apparatus 100 as seen from the near side.

As illustrated in FIG. 5, the image reading and forming apparatus 100 includes an image reading apparatus 200 and an image forming apparatus 10. The image reading apparatus 200 is capable of reading an image on a sheet original G stacked on an original stacking tray 221. The image forming apparatus 10 is capable of forming an image on a sheet S based on the image read by the image reading apparatus 200.

The image reading and forming apparatus 100 further includes a controller 50 configured to control, for example, the image reading apparatus 200 and the image forming apparatus 10.

That is, the image reading and forming apparatus 100 may include, for example, a copying machine or a multifunction peripheral.

The image reading apparatus 200 includes a scanner portion (reading portion) 210 configured to read the image on the sheet original G and an automatic document feeder (hereinafter referred to as "ADF") (conveyance unit) 220 capable of automatically conveying the original G to the scanner portion 210.

The image forming apparatus 10 includes an image forming portion 20 and a sheet feeding portion 30. The image forming portion 20 is configured to form an image on the sheet S being a recording medium. The sheet feeding portion 30 is configured to feed the sheet S to the image forming portion 20. The image forming apparatus 10 further includes a pair of discharge rollers 40 and a sheet discharge tray 45. The pair of discharge rollers 40 is configured to discharge the sheet S having the image formed thereon to the outside of the image forming apparatus 10. The sheet discharge tray 45 receives the discharged sheet S to be stacked thereon.

The image forming portion 20 includes a photosensitive drum 22, a laser scanner unit 21, a transfer portion 24, and a fixing portion 25. The photosensitive drum 22 has a surface on which a toner image is formed. The laser scanner unit 21 is configured to radiate laser light to the surface (photosensitive surface) of the photosensitive drum 22. The transfer portion 24 is configured to transfer the toner image to the sheet S. The fixing portion 25 is configured to fix the toner image. A pair of registration rollers 11 is disposed upstream of the transfer portion 24 on a sheet conveyance passage. The image forming portion 20 further includes a reverse conveyance passage 12. The image forming portion 20 forms an image forming unit configured to form an image on the sheet S based on image information read from the original G by the image reading apparatus 200.

The sheet feeding portion 30 includes a paper feeding cassette 31, a feeding roller 32, a conveyance roller 33a, and a separation roller 33b. The paper feeding cassette 31 has the sheet S stacked therein. The feeding roller 32 is configured to feed the sheet S in the paper feeding cassette 31. The conveyance roller 33a and the separation roller 33b are configured to convey the sheets S while separating the sheets S one by one.

Figure 6:
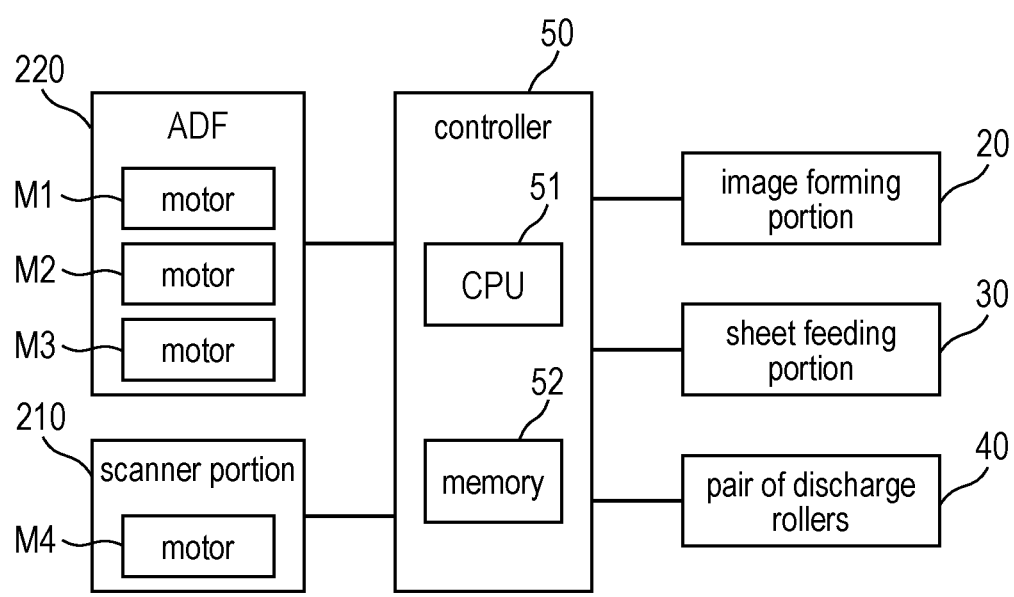
FIG. 6 is a block diagram for illustrating a control system of the image reading and forming apparatus.

FIG. 6 is a block diagram for illustrating a control system of the image reading and forming apparatus 100.

As illustrated in FIG. 6, the ADF 220 including motors M1, M2, and M3, the scanner portion 210 including a motor M4, the image forming portion 20, the sheet feeding portion 30, the pair of discharge rollers 40, and the like are connected to the controller 50 as a control unit of the image reading and forming apparatus 100.

The controller 50 includes a CPU 51 and a memory 52. The CPU 51 is configured to control each of the above-mentioned components. The memory 52, such as a ROM and a RAM, is configured to store various programs such as an image reading program and an image forming program, and various pieces of information.

Figure 8:
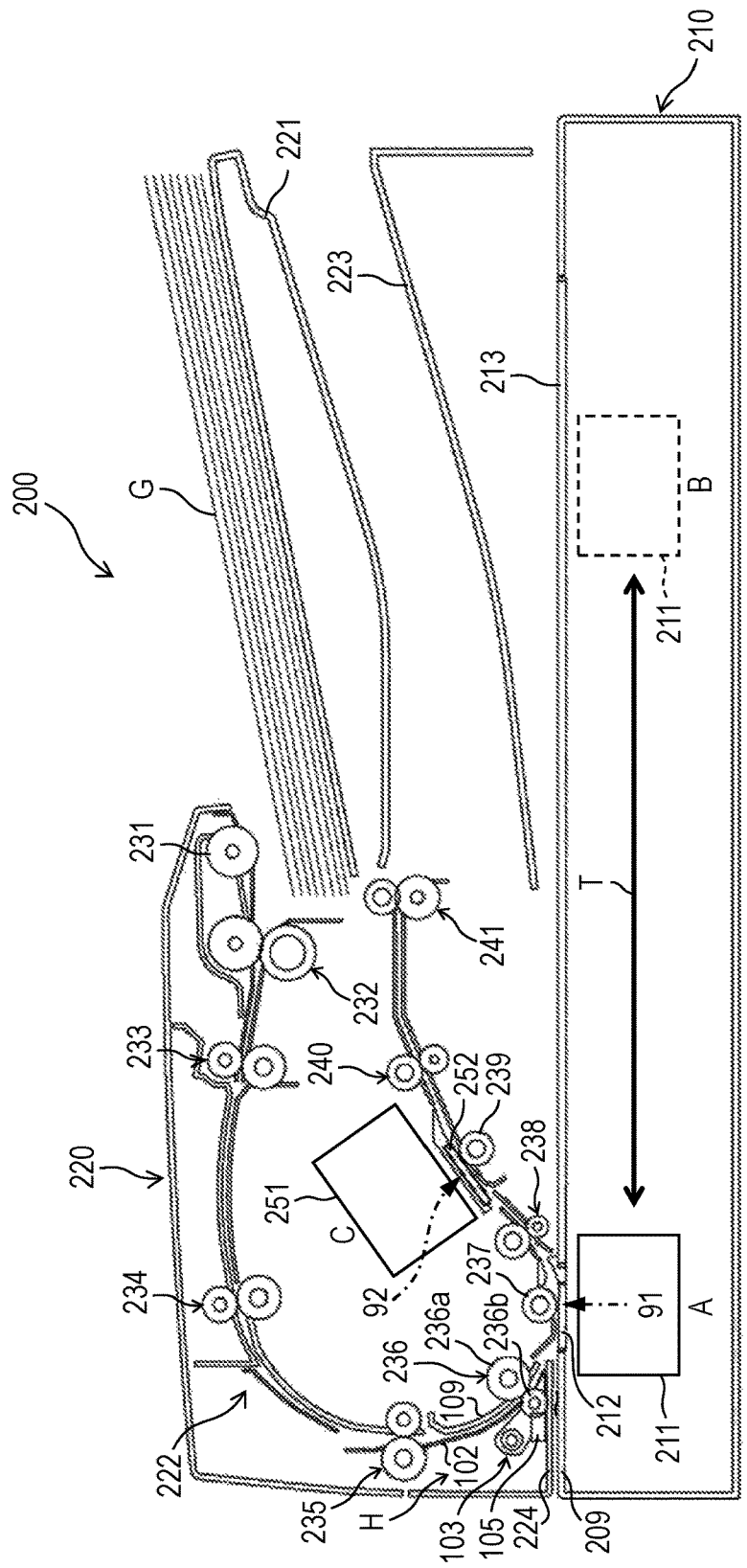
FIG. 8 is a sectional view of the image reading apparatus to which the flow-reading glass according to the first embodiment is mounted.

The controller 50 controls the motor M1 so that a first platen roller 237 (see FIG. 8) rotates at a predetermined rotating speed, and respectively controls the motors M2 and M3 so as to drive a third pair of conveyance rollers 236 and a fourth pair of conveyance rollers 238 (see FIG. 8).

Further, the controller 50 controls each of the image forming portion 20, the sheet feeding portion 30, and the pair of discharge rollers 40.

Next, an image forming operation in the image forming apparatus 10 of the image reading and forming apparatus 100 through control by the controller 50 (image forming control by the controller 50) is described.

In the image reading apparatus 200, when image information of the original G, which is fed by the ADF 220 and read by the scanner portion 210, is input to the image forming apparatus 10, the photosensitive surface of the photosensitive drum 22 is irradiated with laser light from the laser scanner unit 21 based on the input image information.

At this time, the photosensitive surface of the photosensitive drum 22 has been electrically charged in advance via a charging device 27, and is irradiated with the laser light to form an electrostatic latent image on the photosensitive surface. This electrostatic latent image is then developed by a developing device 23 to form a toner image on the photosensitive surface.

Simultaneously with the operation of forming the toner image on the photosensitive surface of the photosensitive drum 22, the sheet S stored in the paper feeding cassette 31 of the sheet feeding portion 30 is fed by the feeding roller 32. The sheets S fed by the feeding roller 32 are nipped by a separation nip portion formed between the conveyance roller 33a and the separation roller 33b, to be separated one by one and conveyed.

Each of the sheets S separated one by one is sent by the pair of registration rollers 11 to the transfer portion 24 in synchronization with formation of the toner image on the photosensitive drum 22. In the transfer portion 24, the toner image on the photosensitive surface of the photosensitive drum 22 is transferred to the sent sheet S.

In the fixing portion 25, the sheet S having the toner image transferred thereto is heated and pressurized, and the toner image is thus melt and fixed to the sheet S. The sheet S having the toner image fixed thereto is discharged by the pair of discharge rollers 40 to the sheet discharge tray 45 and sequentially stacked thereon.

In the case of forming an image on each surface of the sheet S, after fixing of the image to one surface of the sheet S, the sheet S is conveyed again toward the pair of registration rollers 11 while being reversed through the reverse conveyance passage 12, and the operation described above is performed again.

Figure 7:
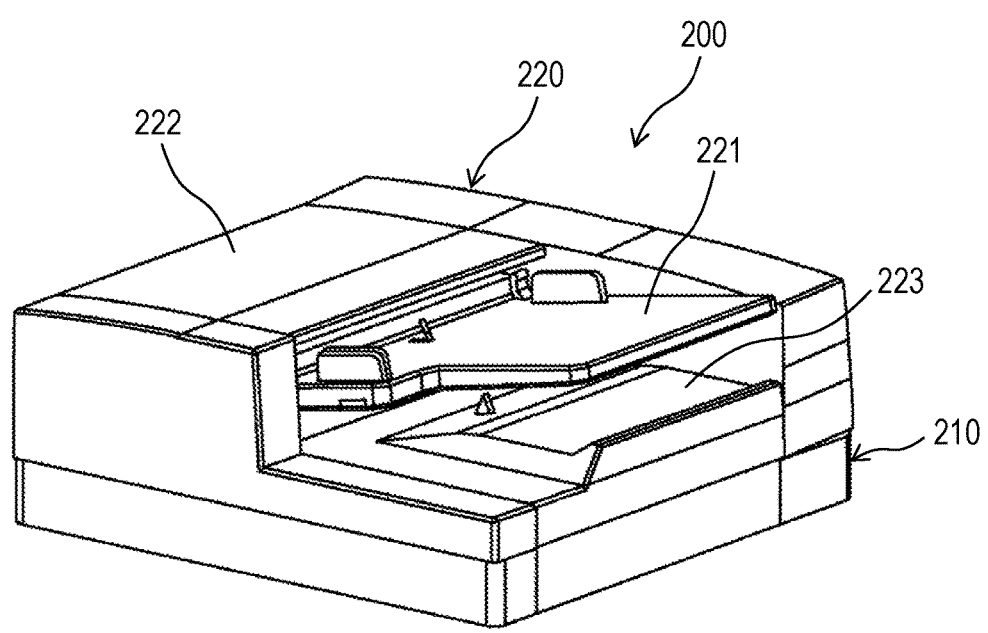
FIG. 7 is a perspective view of an image reading apparatus to which the flow-reading glass according to the first embodiment is mounted.

FIG. 7 and FIG. 8 are a perspective view and a sectional view of the image reading apparatus 200, respectively.

As illustrated in FIG. 7 and FIG. 8, the image reading apparatus 200 includes the scanner portion 210 and the ADF 220.

Further, in the image reading apparatus 200, the ADF 220 is turnably supported by the scanner portion 210 with a hinge (not shown), disposed on the far side, so that an original table glass 213 described later is openable and closable from the near side.

The scanner portion 210 includes a first scanner unit 211 configured to read an image on one surface of the original G. The scanner portion 210 further includes a first flow-reading glass 212 and an original table glass 213. The first flow-reading glass 212 is a light-transmitting member. The original table glass 213 is disposed side by side in a second direction (a right-and-left direction of FIG. 8) with the first flow-reading glass 212.

The first scanner unit 211 is, for example, an integrated reading unit that folds and forms a light path of a reduction imaging optical system, and is configured to read image information by irradiating the image information surface of the original G with light from a light source such as an LED and condensing reflected light, which is reflected on the image information surface, onto a sensor element by using the reduction optical system.

The first scanner unit 211 is connected to a drive belt (not shown). The first scanner unit 211 is movable between a position A (that is, image reading position 91) below the first flow-reading glass 212 and a position B below the original table glass 213, illustrated in FIG. 8, by the drive of the motor M4 (not shown) provided in the scanner portion 210.

The controller 50 can grasp the current position of the first scanner unit 211 with use of a position sensor (not shown) and the number of rotation pulses of the motor M4.

As illustrated in FIG. 8, the first scanner unit 211 is capable of reading an image on one surface of the original G, which is conveyed along an original conveyance passage H, at an image reading position 91 via the first flow-reading glass 212.

In this embodiment, the mode of reading an image while moving the original G on the first flow-reading glass 212 by the ADF 220 under a state in which the first scanner unit 211 is stopped at a position A is referred to as "flow reading (sheet-through mode)". Further, the mode of reading the image while moving the first scanner unit 211 toward the position B in a direction of an arrow T in FIG. 8 under a state in which the original G is placed on the original table glass 213 is referred to as "fixed reading".

As illustrated in FIG. 7 and FIG. 8, the ADF 220 includes the original stacking tray 221, an original conveyance unit 222, and an original discharge portion 223.

The original G for flow reading is stacked on the original stacking tray 221. At the time of the flow reading, the original conveyance unit 222 conveys the original G along the original conveyance passage H. The original G after the flow reading is discharged and stacked on the original discharge portion 223.

The ADF 220 is capable of pressing the original G with a resin plate (not shown) at the time of the fixed reading so as to prevent movement of the original G placed on the original table glass 213.

As illustrated in FIG. 8, the original conveyance unit 222 includes an original feeding roller 231, a pair of separation rollers 232, and a first pair of conveyance rollers 233. The original feeding roller 231 is configured to feed the original G stacked on the original stacking tray 221. The pair of separation rollers 232 is configured to separate the originals G one by one. The first pair of conveyance rollers 233 is configured to pull out the separated original G.

The original conveyance unit 222 further includes a second pair of conveyance rollers 234, the third pair of conveyance rollers 236, the fourth pair of conveyance rollers 238, and a fifth pair of conveyance rollers 240, which are configured to convey the original G.

The original conveyance unit 222 further includes a pair of registration rollers 235, a first platen roller 237, and a pair of discharge rollers 241.

The pair of registration rollers 235 is disposed between the second pair of conveyance rollers 234 and the third pair of conveyance rollers 236, and is configured to correct the skew feed of the original G.

The first platen roller 237 is disposed between the third pair of conveyance rollers 236 and the fourth pair of conveyance rollers 238 and directly above the first flow-reading glass 212.

When the first scanner unit 211 reads an image on the front surface being one surface of the conveyed original G, the first platen roller 237 conveys the original G with a predetermined space from the first flow-reading glass 212 while urging the original G toward the first flow-reading glass 212.

At the image reading position 91, the first platen roller 237 is disposed so as to be opposed to the first scanner unit 211 with the first flow-reading glass 212 placed therebetween.

The first platen roller 237 then presses the original G from the back surface side being another surface to suppress the rise of the original G from the first flow-reading glass 212. That is, the first platen roller 237 forms a suppression rotor for suppressing the rise of the original G from the first flow-reading glass 212.

Further, the pair of discharge rollers 241 is disposed downstream of the fifth pair of conveyance rollers 240, and is configured to discharge the original G, which has been subjected to image reading, to the original discharge portion 223.

In the image reading apparatus 200, a dual scanning ADF is adopted, and the original conveyance unit 222 further includes the following members downstream of the first scanner unit 211 and the first flow-reading glass 212 in the conveyance direction on the original conveyance passage H.

That is, the original conveyance unit 222 further includes a second scanner unit 251, a second flow-reading glass 252, and a second platen roller 239. The second scanner unit 251 is configured to read an image on the back surface being another surface of the original G. The second platen roller 239 is configured to convey the original G with a predetermined space from the second flow-reading glass 252.

The second platen roller 239 is provided directly above the second flow-reading glass 252. When the image on the back surface being another surface of the conveyed original G is to be read, the second platen roller 239 urges the conveyed original G toward the second flow-reading glass 252.

In the image reading apparatus 200, a reading unit similar to the first scanner unit 211 is used as the second scanner unit 251.

The second scanner unit 251 is disposed at a reading position C below the second flow-reading glass 252 on downstream of the first scanner unit 211 in the original conveyance direction, and is configured to read the image on the back surface being another surface of the original G that is conveyed on the original conveyance passage H.

Next, an image reading operation in the image reading apparatus 200 of the image reading and forming apparatus 100 through control by the controller 50 (image reading control by the controller 50) is described.

As illustrated in FIG. 8, first, a freely selected number of originals G placed on the original stacking tray 221 are fed by the original feeding roller 231, and separated one by one at the separation nip portion of the pair of separation rollers 232. The separated original G is then pulled out by the first pair of conveyance rollers 233 and thereafter conveyed by the second pair of conveyance rollers 234 to the nip portion of the pair of registration rollers 235.

At the timing at which the original G reaches the nip portion of the pair of registration rollers 235, the pair of registration rollers 235 is brought into a stationary state. With this, a leading edge of the original G is brought into contact with the nip portion to stop the original G.

In this state, a trailing edge of the original G is pressed by a predetermined amount by the second pair of conveyance rollers 234 located upstream in the original conveyance direction to warp the original G into a bent shape.

When the original G is moving with skew, the leading edge of the original G is inclined with respect to a first direction (the width direction of the original G). However, with the hardness (rigidity) of the original G given by the bending described above, the leading edge of the original G follows the nip line of the pair of registration rollers 235 which is parallel to the first direction.

In this manner, the inclination of the leading edge of the original G is canceled, that is, the skew feed is corrected by the pair of registration rollers 235.

After the skew feed is corrected, conveyance of the original G by the pair of registration rollers 235 is started, and the original G is conveyed further downstream by the third pair of conveyance rollers 236 to reach the image reading position 91 on the first flow-reading glass 212. Then, reading of the image on the front surface being one surface of the original G by the first scanner unit 211 is performed at a predetermined speed.

After that, the original G is conveyed by the fourth pair of conveyance rollers 238. At this time, when the user gives an instruction to read the back surface being another surface of the original G, after the image reading by the first scanner unit 211, through control by the controller 50, the reading of the image on the back surface being another surface of the original G is performed at an image reading position 92 on the second flow-reading glass 252 by the second scanner unit 251 at a predetermined speed.

The original G having been subjected to the image reading is discharged to the original discharge portion 223 by the fifth pair of conveyance rollers 240 and the pair of discharge rollers 241.

The above-mentioned operation is repeated until no placed original G is left on the original stacking tray 221. The presence or absence of the original G placed on the original stacking tray 221 can be detected by a sensor (not shown).

Next, the configuration of the first flow-reading glass 212, which is a light-transmitting member for an image reading apparatus configured to read an image on a conveyed original according to this embodiment, is described.

Figure 1A:
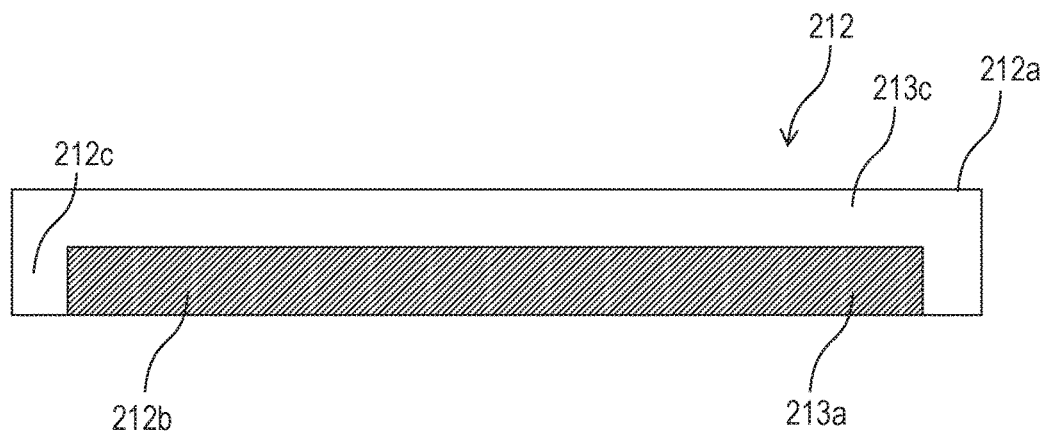
FIG. 1A is a top view of a flow-reading glass according to a first embodiment of the present invention with omitting to illustrate a sheet member 212*s*.
Figure 1B:
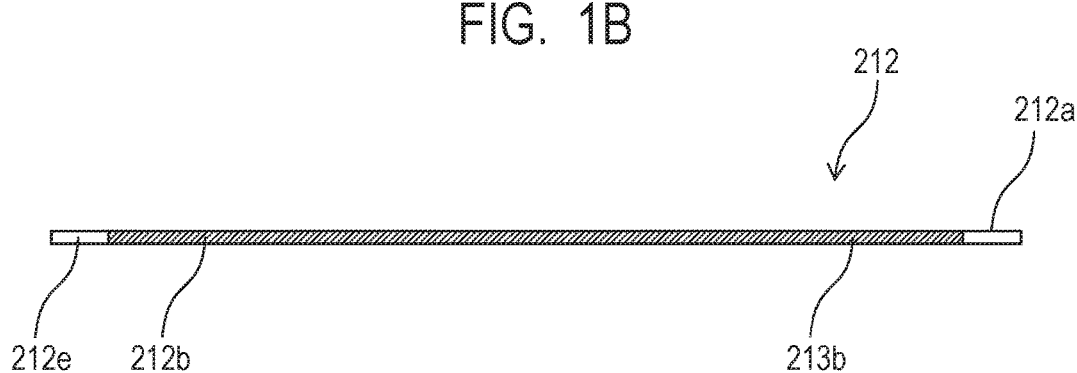
FIG. 1B is a side view of the flow-reading glass according to the first embodiment.
Figure 1C:
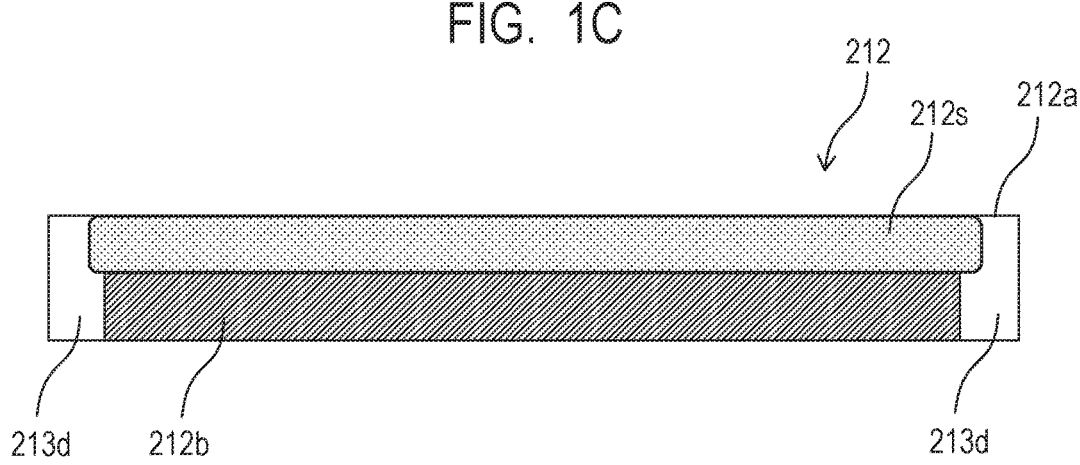
FIG. 1C is a top view of the flow-reading glass according to the first embodiment.

FIG. 1A is a top view of the flow-reading glass 212 according to this embodiment with omitting to illustrate a sheet member 212s. FIG. 1B and FIG. 1C are a side view and a top view, respectively, of the first flow-reading glass 212 according to this embodiment.

Figure 9:
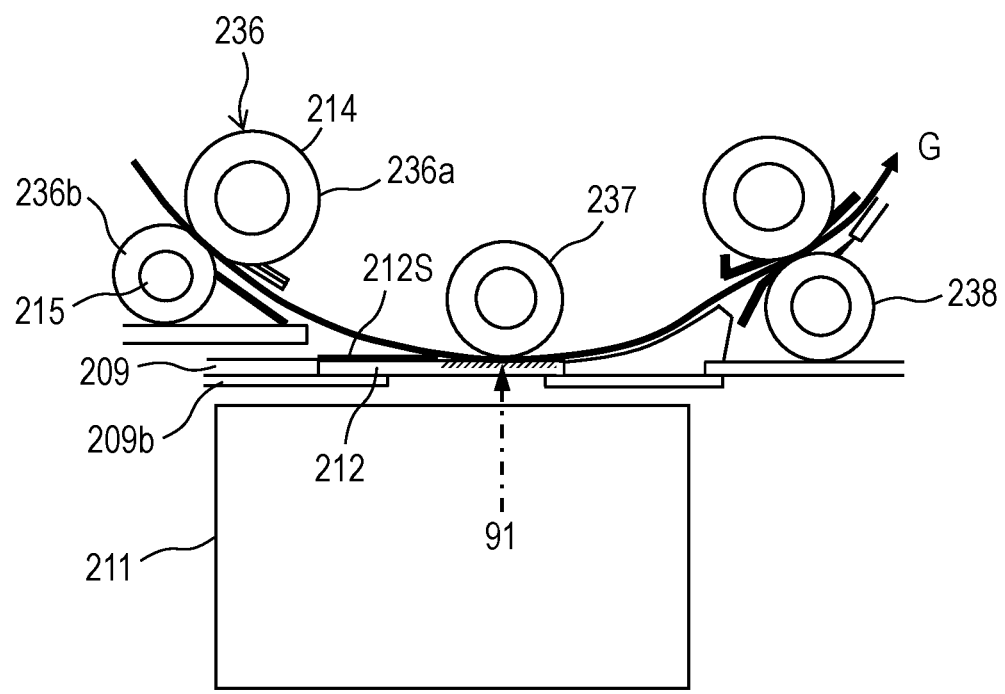
FIG. 9 is an enlarged sectional view of a main part of a first flow-reading glass and its vicinity in the image reading apparatus.

FIG. 9 is an illustration of an enlarged sectional view of a main part of the first flow-reading glass 212 and its vicinity in the image reading apparatus 200.

As illustrated in FIG. 1A, for the first flow-reading glass 212, the transparent dirt-proof coat 212b, which is excellent in oil repellency and smoothness, is applied to a first region 213a on one surface (first light-transmitting surface) 212c of the glass substrate 212a which is the surface in contact with the original G.

As illustrated in FIG. 1B, the transparent dirt-proof coat 212b, which is excellent in oil repellency and smoothness, is applied also to a second region 213b which is in contact with the first region 213a and on the side surface 212e connected to the front surface 212c.

As illustrated in FIG. 1C, a sheet member 212s is provided to a third region 213c located upstream, in the conveyance direction, of the first region 213a on the front surface 212c.

Further, as illustrated in FIG. 9, the sheet member 212s is grounded via a conductive sheet (not shown) and a metal frame 209b.

The sheet member 212s itself has conductivity. Specifically, the sheet member 212s is formed of a resin sheet having conductivity and a conductive double-sided tape.

The sheet member 212s mainly has two functions. One function is to eliminate electricity (remove charge) from paper powder electrostatically adsorbed to the original G, which has been generated on the original G and the conveyance passage by bringing the grounded sheet member 212s into contact with the conveyed original G.

Thus, even when the front surface 212c of the first flow-reading glass 212 is electrically charged by the contact charging between the conveyed original G and the first flow-reading glass 212 due to the friction contact therebetween, it is possible to prevent adsorption of the paper powder or the like having been subjected to removal of charge.

Another function is to control the thickness of the sheet member 212s and optimize an entry angle and a contact position of the original G with respect to the first flow-reading glass 212, thereby enabling achievement of both the durability of the dirt-proof coat 212b and the self-cleaning performance by passing of the original on floating dust adhering to the front surface 212c of the first flow-reading glass 212.

The self-cleaning performance mentioned here is a function of the original G itself to scrape off the floating dust on the front surface 212c of the first flow-reading glass 212.

That is, as described above, the electricity has been removed from floating dust such as paper powder by the sheet member 212s, and hence the floating dust is less liable to be electrostatically adsorbed onto the front surface 212c of the first flow-reading glass 212.

Therefore, the floating dust, which is not electrostatically adsorbed onto the front surface 212c of the first flow-reading glass 212, can be easily self-cleaned by passing of the original.

Further, through control of the thickness of the sheet member 212s, shaving of the dirt-proof coat 212b and the like can be reduced to the minimum, thereby being capable of achieving effective long-term reduction in generation of fixed dust caused by a sticky adherent generated due to the dirt-proof coat 212b.

As described above, the dirt-proof coat 212b is applied to the first region 213a on one surface 212c of the first flow-reading glass 212 which is the surface in contact with the original G, and applied to the second region 213b which is in contact with the first region 213a and on the side surface 212e connected to the front surface 212c.

Further, a sheet member 212s is provided to the third region 213c located upstream, in the conveyance direction, of the first region 213a on the front surface 212c.

Here, the dirt-proof coat 212b is absent in the third region 213c on the front surface 212c. This is because, when the dirt-proof coat 212b is applied to the third region 213c at the time of providing the sheet member 212s and the conductive sheet electrically connecting the sheet member 212s and the metal frame 209b, these sheets cannot be provided, or easily peeled even when the sheets are provided.

Further, as illustrated in FIG. 1C, a fourth region 213d in which the dirt-proof coat 212b or the sheet member 212s is absent is at each end in the first direction, which is perpendicular to the conveyance direction, on the front surface 212c. The fourth region 213d is disposed outside the reading range for the scanner portion 210 of the image reading apparatus 200.

As described above, in the first flow-reading glass 212 according to this embodiment, the dirt-proof coat 212b is applied also to the second region 213b which is in contact with the first region 213a and on the side surface 212e connected to the front surface 212c.

This is because of the following reason. As illustrated in FIG. 9, the first flow-reading glass 212 is fitted to a housing 209 so as to prevent entry of a foreign matter into the casing of the image reading apparatus 200, and is then urged from above by an urging member (not shown).

With the dirt-proof coat 212b applied also to the second region 213b which is in contact with the first region 213a and on the side surface 212e connected to the front surface 212c, slidability of the first flow-reading glass 212 is improved to facilitate its removal when the first flow-reading glass 212 needs to be replaced, so that it is possible to improve ease of maintenance for the first flow-reading glass 212.

Next, a method of manufacturing the first flow-reading glass 212, which is the transparent member for the image reading apparatus configured to read an image on a conveyed original according to this embodiment, is described.

In the first flow-reading glass 212, the dirt-proof coat 212b is fluorine-containing organic compound coating, and, in particular, a silicon-containing perfluoropolyether compound excellent in oil repellency is used.

Such a coating material can be coated on a glass substrate by various methods such as vacuum evaporation and application processing. Of these coating methods, the application processing method which is relatively low in processing cost has been widely employed. However, for improvement in adhesiveness of the coating material to the glass, the vacuum evaporation method is preferably used for the film formation.

In the first flow-reading glass 212 according to this embodiment, the dirt-proof coat 212b is evaporated and formed into the film directly on the front surface 212c of the glass substrate 212a without intermediation of an intermediate layer (without intermediation of other members).

Here, in the case of processing the coating material by vacuum evaporation, the film formation cost depends on the number of flow-reading glasses that can be processed at once.

Figure 10A:
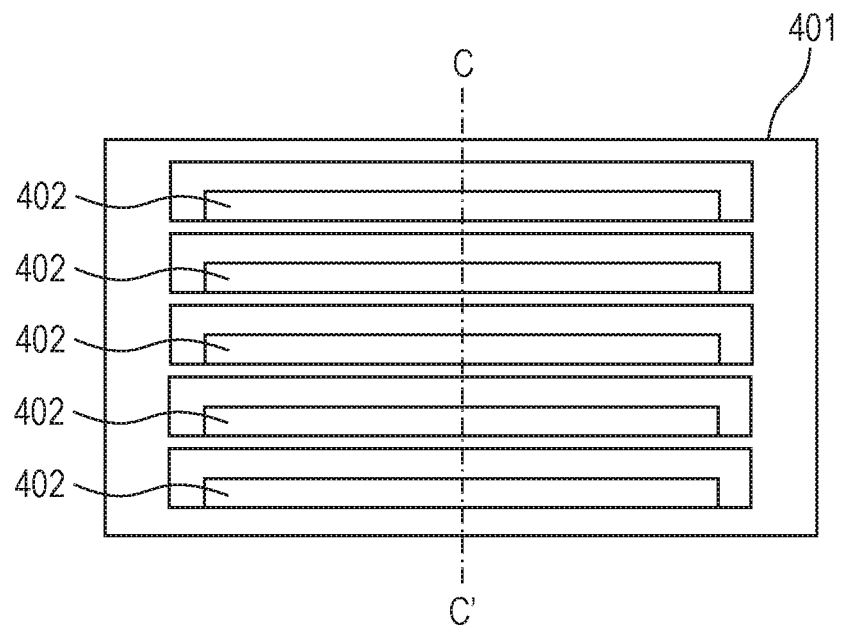
FIG. 10A is a top view for illustrating a state in which a plurality of flow-reading glasses are disposed in a related-art masking jig.

FIG. 10A is a top view for illustrating a masking jig 401 which has a plurality of openings 402 and in which a plurality of flow-reading glasses 312 are arranged in order to perform a related-art vacuum evaporation.

Figure 10B:
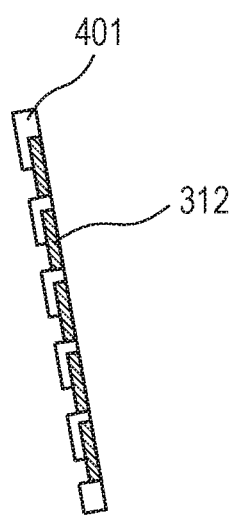
FIG. 10B is a sectional view for illustrating a state in which the plurality of flow-reading glasses are disposed in the related-art masking jig.

FIG. 10B is a sectional view of the masking jig 401 in which the plurality of flow-reading glasses 312 are disposed, taken along a line C-C'.

As illustrated in FIG. 10A and FIG. 10B, as compared with the case of simply coating the entire glass surface, complicated masking is required for performing complicated coating as in this embodiment, and hence there has been a problem in that the number of products to be processed is decreased, thereby resulting in an increase in cost.

The applicant of the present application found that by devising arrangement of the plurality of flow-reading glasses in the masking jig, the number of products to be processed can be increased even when complicated coating as in this embodiment is to be provided, thereby being capable of reducing the cost.

Figure 2A:
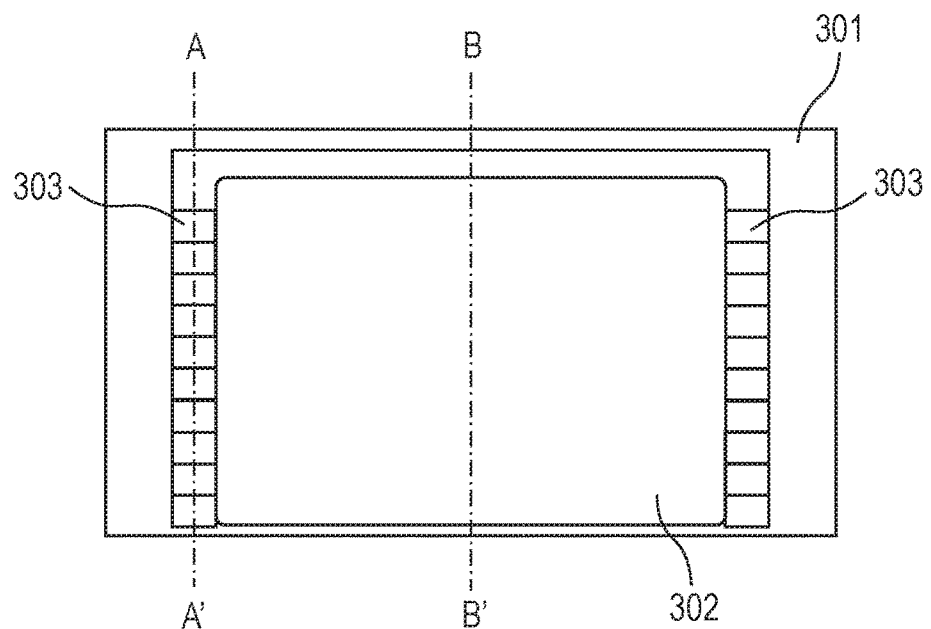
FIG. 2A is a top view for illustrating a state in which flow-reading glasses according to the first embodiment are disposed in a masking jig.

FIG. 2A is a top view for illustrating a masking jig (support member) 301 which has an opening 302 and in which a plurality of flow-reading glasses 212 according to this embodiment are arranged for vacuum evaporation processing.

Figure 2B:
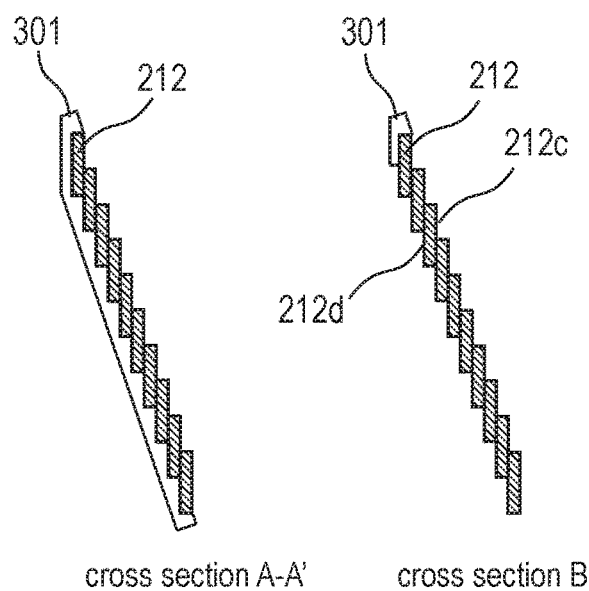
FIG. 2B is a sectional view for illustrating a state in which the flow-reading glasses according to the first embodiment are disposed in the masking jig.

FIG. 2B is a sectional view for illustrating the masking jig 301 in which the plurality of flow-reading glasses 212 are disposed, and are illustrations taken along a line A-A' and a line B-B', respectively.

As illustrated in FIG. 2A and FIG. 2B, it is characterized in that a step 303 is provided at each end in the first direction in the masking jig 301. In other words, the masking jig 301 has a step-like front surface in contact with another surface 212d (second light-transmitting surface) of each of the substrates 212a of the plurality of flow-reading glasses 212.

The plurality of flow-reading glasses 212 are arranged in such step portion 303 so as to support each end in the first direction on another surface 212d of each of the substrates 212a of the plurality of flow-reading glasses 212, thereby enabling superposition of those panes of glass to each other. That is, the flow-reading glass 212 itself can serve as a mask in the coating.

In other words, in this embodiment, the substrates 212a of the plurality of flow-reading glasses 212, each having the mutually facing surfaces 212c and 212d, are arranged so that a part of one surface 212c and a part of another surface 212d, among the substrates 212a of two adjacent flow-reading glasses 212, are in contact with each other.

It is thus possible to apply the dirt-proof coat 212b to the first region 213a on the front surface 212c of the substrate 212a of the flow-reading glass 212, which is the surface in contact with the original G.

At the same time, the dirt-proof coat 212b can be applied also to the second region 213b which is in contact with the first region 213a and on the side surface 212e connecting between the surfaces 212c and 212d.

Accordingly, the substrates 212a of the plurality of flow-reading glasses 212 are arranged so as to be superposed on each other, thereby being capable of increasing the number of flow-reading glasses 212 that can be arranged in the masking jig 301, that is, increasing the number of products to be processed. Thus, the cost can be reduced.

There can be foreseen a problem in that simple superposition of the plurality of flow-reading glasses 212 causes problems such as management of tolerance of the mask position and occurrence of wraparound at the time of coating due to formation of a space between the glass substrates.

Therefore, in this embodiment, the masking jig 301 including the above-mentioned step portion 303 is used to enable improvement in productivity without causing such problems.

Specifically, for example, in the related-art masking jig 401, only five flow-reading glasses 312 can be arranged as illustrated in FIG. 10A and FIG. 10B, whereas in the masking jig 301 according to this embodiment, ten flow-reading glasses 312 can be arranged as illustrated in FIG. 2A and FIG. 2B, and a processing yield can thus be doubled.

Figure 3:
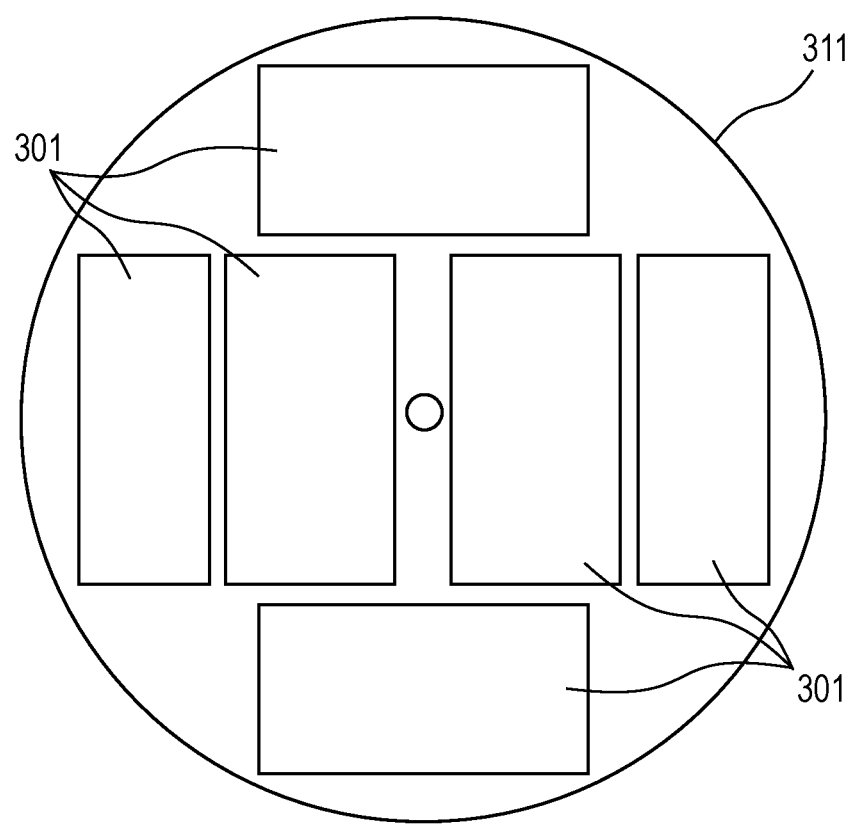
FIG. 3 is a top view for illustrating a state in which masking jigs each having the flow-reading glasses according to the first embodiment disposed therein are disposed on an evaporation cover.
Figure 4:
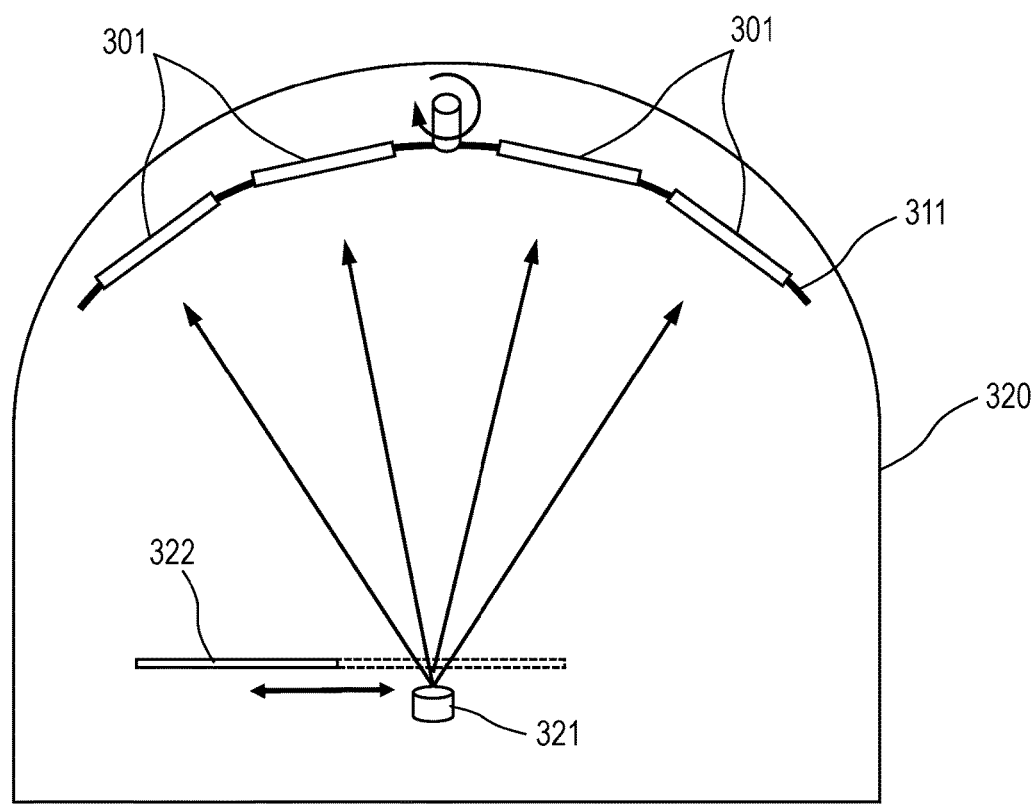
FIG. 4 is a view for illustrating a state in which an evaporation cover with the masking jigs each having the flow-reading glasses according to the first embodiment disposed therein is disposed in a vacuum evaporation device.

The masking jig 301 in which the substrate 212a of the flow-reading glass 212 according to this embodiment is disposed is mounted to an evaporation cover 311 as illustrated in FIG. 3, which is then set in a vacuum evaporation machine 320 as illustrated in FIG. 4, for the film formation. In other words, a plurality of masking jigs 301 for respectively supporting the substrates 212a of the plurality of flow-reading glasses 212 are arrayed, and the dirt-proof coat 212b is simultaneously provided on the substrates 212a of the plurality of flow-reading glasses 212 which are respectively supported by the plurality of masking jigs 301.

Here, as illustrated in FIG. 4, the vacuum evaporation machine 320 includes an evaporation source 321 and a shutter 322.

As a material for the coating material to be subjected to vacuum evaporation, there has been used a fluorine-containing organic compound such as a silicon-containing perfluoropolyether compound, which is a material commercially available as a fluorine dirt-proof coat.

Then, the sheet member 212s is provided to the third region 213c located upstream, in the conveyance direction, of the first region 213a on the front surface 212c of the flow-reading glass 212 with the vacuum evaporation coating provided thereon.

Although the case of the film formation according to the vacuum evaporation system has been described thus far, also in the case of the film formation according to the application processing system by using the masking jig 301, improvement in productivity and reduction of cost can be achieved.

The description has been given in this embodiment by using the image reading and forming apparatus 100 including the electrographic image forming apparatus 10. However, alternatively, for example, the flow-reading glass being the light-transmitting member according to this embodiment is applicable to an image reading and forming apparatus including an inkjet image forming apparatus that forms an image on a sheet by ejecting an ink liquid from a nozzle.

In the foregoing, the first flow-reading glass 212 has been described above. However, a similar configuration is also applied to the second flow-reading glass 252 of the image reading apparatus 200.

According to the present invention, there can be provided a method of manufacturing a light-transmitting member for an image reading apparatus configured to read an image on a conveyed original with coating provided on a part of a surface thereof at low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-106432, filed May 30, 2017, which is hereby incorporated by reference herein in its entirety.

What is claimed is:

1. A method of manufacturing a light-transmitting member for an image reading apparatus configured to read an image on a conveyed original, the method comprising:
    disposing a plurality of substrates each having a first light-transmitting surface and a second light-transmitting surface opposed to each other so that a part of the first light-transmitting surface of one of two adjacent substrates is in contact with a part of the second light-transmitting surface of another of the two adjacent substrates; and
    providing coating on the first light-transmitting surface of each of the plurality of substrates.

2. A method according to claim 1, comprising providing a conductive sheet member to a region in which the coating is absent on the first light-transmitting surface of each of the plurality of substrates.

3. A method according to claim 1, wherein the providing includes providing coating on each of the plurality of substrates by vacuum evaporation.

4. A method according to claim 1, wherein the coating includes an organic compound containing fluorine.

5. A method according to claim 1, wherein the disposing includes supporting the second light-transmitting surface of each of the plurality of substrates by using a support member.

6. A method according to claim 5, wherein the providing includes arraying a plurality of the support members that respectively support the plurality of substrates, and simultaneously providing coating on the plurality of substrates respectively supported by the plurality of support members.

7. A method according to claim 5, wherein the support member includes a step-like surface in contact with the second light-transmitting surface of each of the plurality of substrates.

8. A light-transmitting member for an image reading apparatus configured to read an image on a conveyed original, the light-transmitting member comprising a substrate having a first light-transmitting surface, a second light-transmitting surface to which the first light-transmitting surface is opposed and a side surface that connects the first light-transmitting surface and the second light-transmitting surface to each other,
    wherein the first light-transmitting surface includes a first region to which coating is provided and a second region in which the coating is absent, and
    wherein the side surface includes a region which is in contact with the first region, the region being provided with the coating.

9. A light-transmitting member according to claim 8, comprising a conductive sheet member provided to the second region.

10. A light-transmitting member according to claim 9, wherein the first light-transmitting surface includes a third region in which the coating and the sheet member is absent.

11. A light-transmitting member according to claim 8, wherein the coating includes an organic compound containing fluorine.

12. A light-transmitting member according to claim 8, wherein the coating is provided on the first light-transmitting surface without intermediation of other members.

13. An image reading apparatus, comprising:
    the light-transmitting member of claim 8;
    a conveyance unit configured to convey an original; and
    a reading portion configured to read an image on the original through the light-transmitting member.

14. An image reading apparatus according to claim 13, wherein the first light-transmitting surface is to be opposed to the original, and
    wherein the first region and the second region are disposed in the stated order from downstream in a direction in which the original is conveyed.

15. An image reading apparatus according to claim 14, wherein an end in a direction perpendicular to the conveyance direction on the first light-transmitting surface includes a third region in which the coating and the sheet member is absent.

16. An image reading apparatus according to claim 15, wherein the third region is disposed outside a reading range for the reading portion.

17. An image reading and forming apparatus, comprising:
the image reading apparatus of claim 13; and
an image forming apparatus configured to form an image on a photosensitive surface based on the image on the original.

\* \* \* \* \*